(No Model.)  
J. A. BRILL.  
RAILWAY CAR.  
No. 418,441.   Patented Dec. 31, 1889.
2 Sheets—Sheet 1.
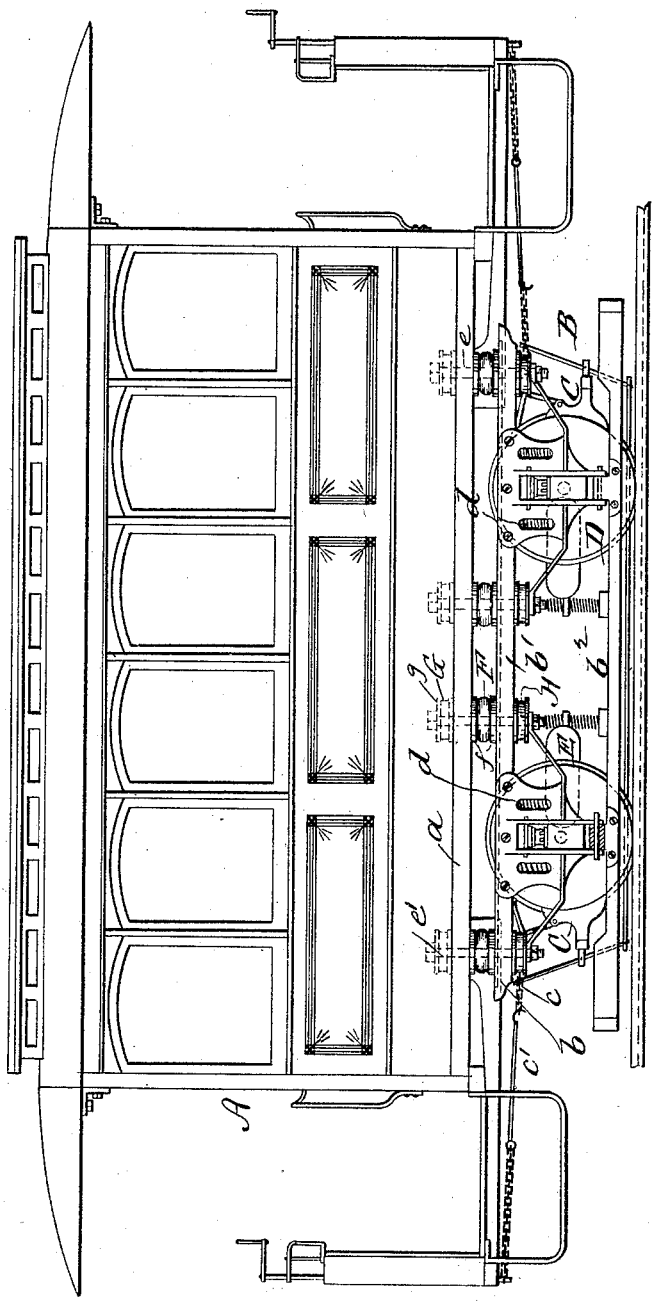
WITNESSES:  
INVENTOR,  
John A. Brill  
By S. J. Van Stavoren  
attorney (No Model.)
J. A. BRILL.
RAILWAY CAR.
No. 418,441. Patented Dec. 31, 1889.
2 Sheets—Sheet 2.
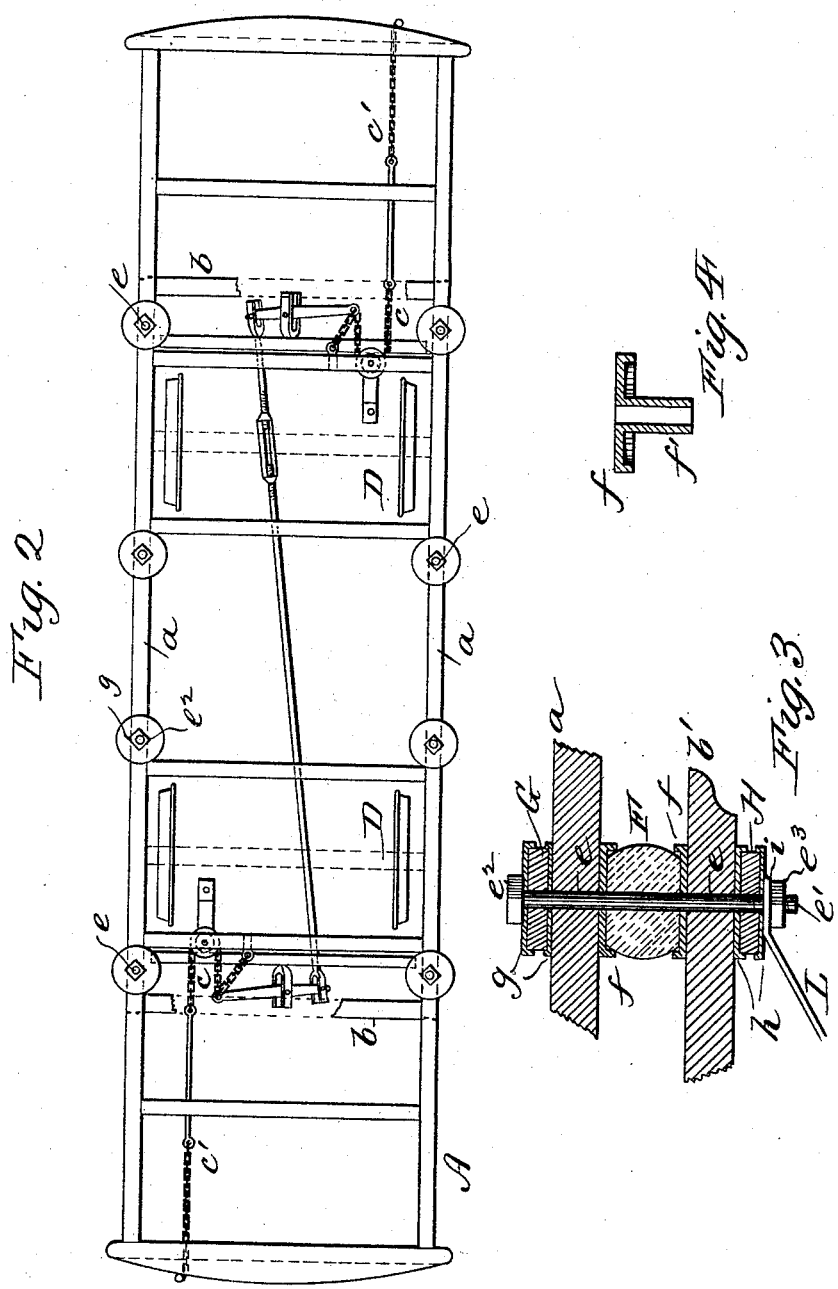
WITNESSES:
INVENTOR,
John A. Brill
By S. J. VanStavoren
Attorney

UNITED STATES PATENT OFFICE.

JOHN A. BRILL, OF PHILADELPHIA, PENNSYLVANIA.

RAILWAY-CAR.

SPECIFICATION forming part of Letters Patent No. 418,441, dated December 31, 1889.

Application filed April 27, 1889. Serial No. 308,851. (No model.)

*To all whom it may concern:*

Be it known that I, JOHN A. BRILL, a citizen of the United States, residing at Philadelphia, in the county of Philadelphia and State of Pennsylvania, have invented certain new and useful Improvements in Railway-Cars, of which the following is a specification.

My invention has relation to street-railway cars provided with what are now known as "independent rigid trucks"—that is, a truck having all the running-gears, the grip, electric or other motor or analogous appliances, the wheel or track brake-shoes, track-brushes, and fenders suitably mounted or supported wholly thereon, so that said truck, with all of said appliances in position, can be passed under a car and rigidly secured thereto, and is easily and quickly removable therefrom when it is necessary to replace a truck by another similarly equipped.

My invention has for its object to provide a rigid connection between the car-body and truck, which admits of the truck having more or less lateral or swaying movement independent of the car-body to conform to any irregularities in the gage of the tracks and which allows of the interposition of springs between the car-body and truck in addition to the usual axle-box spring-supports for the truck-frame and car-body, whereby I provide an easier-riding car than has heretofore been made.

My invention accordingly consists of the combinations, constructions, and arrangements of parts, as hereinafter described in the specification and pointed out in the claims, reference being had to the accompanying drawings, wherein—

Figure 1 is an elevation showing a type of car with independent rigid truck having electric motor and supporting-frame therefor and springs and rigid connection between the car-body and truck embodying my improvements. Fig. 2 is a plan of car-sill frame with end platform-frames and part of truck, showing location of rigid connections between truck and car-body on both sides of the same. Fig. 3 is a vertical section, drawn to an enlarged scale, showing more plainly the preferable form of rigid connections and springs between the car-body and truck; and Fig. 4 is a section of a seat or cap for said springs.

A represents a car; B, the independent rigid truck composed of a main frame $b$ and a lower or secondary frame $b^2$, upon which are suitably supported the brake-shoes C and their actuating mechanism $c$ $c'$, wheels D, with axle-boxes and usual pedestals and spring-supports $d$, and electric motor, grip, or analogous devices E, all of which may be constructed and arranged as shown, or as desired, as I do not confine myself to any particular form of independent rigid truck.

In the sill-pieces $a$ of the car and in the side pieces $b'$ of the truck-frame $b$ are registering vertical openings $e$, through which pass bolts $e'$, having head $e^2$ and nut $e^3$. Between the truck and body-sills or frame-pieces $a$ and $b'$ are located rubber, spiral, or other cushions or springs F, said bolts $e'$ passing through the cushions or springs, as more plainly shown in Fig. 3. When rubber or spiral springs F are used, suitable metal caps or seats $f$ are interposed between the ends of springs F and the sills $a$ and truck-frame sides $b'$, which caps or seats may be plates, as shown in Fig. 3, or be provided with sleeves $f'$, as indicated in Fig. 4, fitting the bolts $e'$, to prevent the springs coming into contact with the bolts $e$, to avoid undue wear of the walls of the openings in said springs. Between the sills $a$ and the heads $e^2$ of bolts $e'$ are interposed other springs G and caps or seats $g$ therefor, and corresponding springs H and caps or covers $h$ are interposed between the nuts $e^3$ and the truck-frame sides $b'$. The bolts $e'$ may fit snugly the openings $e$ in sills $a$ and truck-frame sides $b'$; but I prefer to make such a fit a loose one, so that the bolts will have a slight or more or less play or movement in said openings.

As shown, a bolt-connection $e'$ and springs F, G, and H are located at each of the four corners of the truck-frame, and one, two, or more corresponding connections and springs are located intermediately of said corner connections and springs, so that the car-body is spring-supported upon the truck B throughout its length, in addition to the usual axle-box spring-support $d$, and hence the car-body rides much easier than is the case when no springs are interposed between the body and truck. As the rigid connection or bolts $e'$ have more or less play in their bearings, the truck has a corresponding lateral or swaying movement independent of the car to admit of the truck conforming to the irregularities of the gage of the tracks without imparting such motion to the car-body. A further advantage of the use of said described rigid connections and springs is that overloading of one end of the car does not tend to raise the forward wheels from the tracks. The undue vertical vibration of said end of the car, due to the overloading, is mainly taken up or compensated for by the compression of springs G.

If desired, the ends $i$ of the pedestal-braces L may be secured to the bolts $e'$, as shown.

To remove the truck and its appurtenances, the car-brake-actuating chains $c$ are unhooked or uncoupled from the platform-chain connections $c'$, the nuts $e^3$ released, and the car-body is raised to disengage the bolts $e'$ from truck-frame openings $e$, whereupon the truck is run out from under the car for replacement by a new truck similarly equipped, or to admit of either the car or truck being laid by for repairs or for other purposes without putting both the car and truck out of service.

What I claim is—

1. In combination with the car-body A, the truck B, having a series of bolt-connections $e'$ and springs F, G, and H, substantially as set forth.

2. In combination with car-body sills $a$, the independent rigid truck-frame sides $b'$, bolts $e'$, passing through said sills and sides, springs F, interposed between the sills and sides, and springs G and H, interposed between the ends of the bolts and said sills and sides, substantially as set forth.

In testimony whereof I affix my signature in presence of two witnesses.

JOHN A. BRILL.

Witnesses:
GEO. R. BYINGTON,
S. J. VAN STAVOREN.